2/4/97 RE 32,346

United States Patent [19]

Klamer et al.

[11] E Patent Number: Re. 32,346

[45] Reissued Date of Patent: Feb. 3, 1987

[54] TRAINER/LEARNER SKATE

[75] Inventors: Reuben B. Klamer, Los Angeles; Robert J. Mortonson, Seal Beach, both of Calif.

[73] Assignee: Trend Products Group, Los Angeles, Calif.

[21] Appl. No.: 547,646

[22] Filed: May 21, 1984

Related U.S. Patent Documents

Reissue of:

[64] Patent No.: 4,334,690
Issued: Jun. 15, 1982
Appl. No.: 90,890
Filed: Nov. 5, 1979

[51] Int. Cl.[4] ..... A63C 17/14

[52] U.S. Cl. ..... 280/11.2; 188/82.7; 280/11.21

[58] Field of Search ..... 280/11.2, 11.21, 11.23, 280/11.26, 11.3, 11.19; 188/82.7, 30, 31, 69; 24/204 R

[56] References Cited

U.S. PATENT DOCUMENTS

| | | | |
|---|---|---|---|
| 899,963 | 9/1908 | Ferguson | 280/11.2 |
| 1,016,447 | 2/1912 | Sheahan | 280/11.21 |
| 1,996,671 | 4/1935 | Busby | 280/11.23 |
| 2,117,704 | 5/1938 | Coldwell et al. | 280/11.26 |
| 3,224,785 | 12/1965 | Stevenson | 280/11.2 |
| 3,271,010 | 9/1966 | Gray | 188/82.7 X |
| 3,509,646 | 5/1970 | Vietas | 280/11.3 X |
| 3,626,610 | 12/1971 | Dassler | 24/204 R |
| 4,061,348 | 12/1977 | Carter | 280/11.21 |
| 4,108,452 | 8/1978 | Baron | 280/11.3 |

FOREIGN PATENT DOCUMENTS

| | | |
|---|---|---|
| 1341539 | 9/1963 | France . |
| 1508181 | 4/1978 | United Kingdom . |

*Primary Examiner*—Joseph E. Valenza
*Assistant Examiner*—Donald W. Underwood
*Attorney, Agent, or Firm*—Cushman, Darby & Cushman

[57] ABSTRACT

A roller skate having front and rear wheels mounted on a base plate member, a ratchet and pawl assembly mounted in association with at least one wheel such that said wheel is rotatable in one direction only when the pawl engages the ratchet. A back stop member is mounted on the rear of the base plate such that it will engage the ground or other supporting surface when the front of the skate is raised to a predetermined height. The base plate of the roller skate is adjustable along its longitudinal axis. The upper portion of the skate has quick release straps for securing the shoe or bare foot of the skater to the skate.

4 Claims, 7 Drawing Figures

24
27
27
27
26
18
14
12
32
28
56
57
16
18
38
10
34
40
60

40
34
57
14
12
46
18
32
20
22
4
4
28
46
16
57
40
34

27
27
28
56
40
57

62
34
32

TRAINER/LEARNER SKATE

Matter enclosed in heavy brackets [ ] appears in the original patent but forms no part of this reissue specification; matter printed in italics indicates the additions made by reissue.

BACKGROUND OF THE INVENTION

The present invention pertains to roller skates. More particularly, the invention relates to a roller skate which is adapted to assist beginners to learn to skate more easily and safely than on conventional roller skates.

Conventional roller skates have been available for many years. Typically, conventional roller skates include four wheels, a pair of which are located at the front end of the skate and the second pair located at the rear end of the skate. The skates can be adapted to be attached to normal walking shoes or can be constructed so that the shoe is an integral part of the skate. The wheels of the conventional roller skate will turn either in the forward or rearward direction. Because of the ability of the skate to roll in either direction, it is in some instances very difficult for a beginning skater to safely and easily learn to skate. As often occurs, a beginning skater will attempt to stop his forward motion only to begin to roll backwards. Unaccustomed to this motion a beginning skater will lose his balance. In attempting to regain his balance, the skater will move his arms rapidly in a windmill-fashion and his feet will move rapidly in a treadmill fashion, all of which cause his backward motion to increase until the skater is eventually thrown to the ground as his feet fly up before him. This creates a severe risk of injury to the beginning skater. This risk has become more acute in recent times as more and more people of all ages are attempting to learn to roller skate.

Therefore, a need exists in the art for a roller skate which may be used as a training skate for the beginner such that he or she may learn to skate more easily, minimizing the risk of injury. It is desirable, however, that this roller skate be capable of being used in the conventional manner by the more advanced skater. It is also desirable that the skate be adjustable to fit a range of shoe sizes and that it be quickly and easily attached to and released from the shoe or bare foot of the skater.

SUMMARY OF THE INVENTION

A trainer/learner skate is disclosed in which a ratchet and pawl assembly is attached to at least one wheel of a roller skate thereby restricting the motion of that wheel, and hence the motion of the roller skate, to the forward direction only. The ratchet and pawl assembly may be selectively disengaged to allow the roller skate to function in a conventional manner. A back stop member is attached to the rear of the roller skate and designed to come into contact with the ground or other support surface when the toe of the skate is raised to a predetermined height. The wheels of the roller skate in the present invention are attached to a base plate which is longitudinally adjustable to provide for attachment thereof to a range of shoe sizes. In one preferred embodiment of the invention, the upper portion of the skate is fitted with self-adhering quick release straps which quickly and easily attach either the shoe or the bare foot of the skater to the roller skate.

Accordingly, the general object of the present invention is to provide a roller skate which will enable a novice skater to learn to skate quickly, easily, and safely.

A further object of the present invention is to provide a roller skate in which one or more of the wheels may be selectively restricted to forward motion only.

It is another object of the present invention to provide a roller skate which includes a back stop member which functions as a brake for the roller skate to aid in preventing the roller skater from falling backwards.

It is yet another object of the present invention to provide a roller skate in which the base plate is adjustable so as to fit a range of shoe sizes and which may be quickly and easily attached to and removed from the shoe or bare foot of the roller skater.

These and other objects and advantages will be readily apparent to those skilled in the art upon a reading of the preferred embodiment and appended claims.

DETAILED DESCRIPTION OF PREFERRED EMBODIMENT

Figure 1:
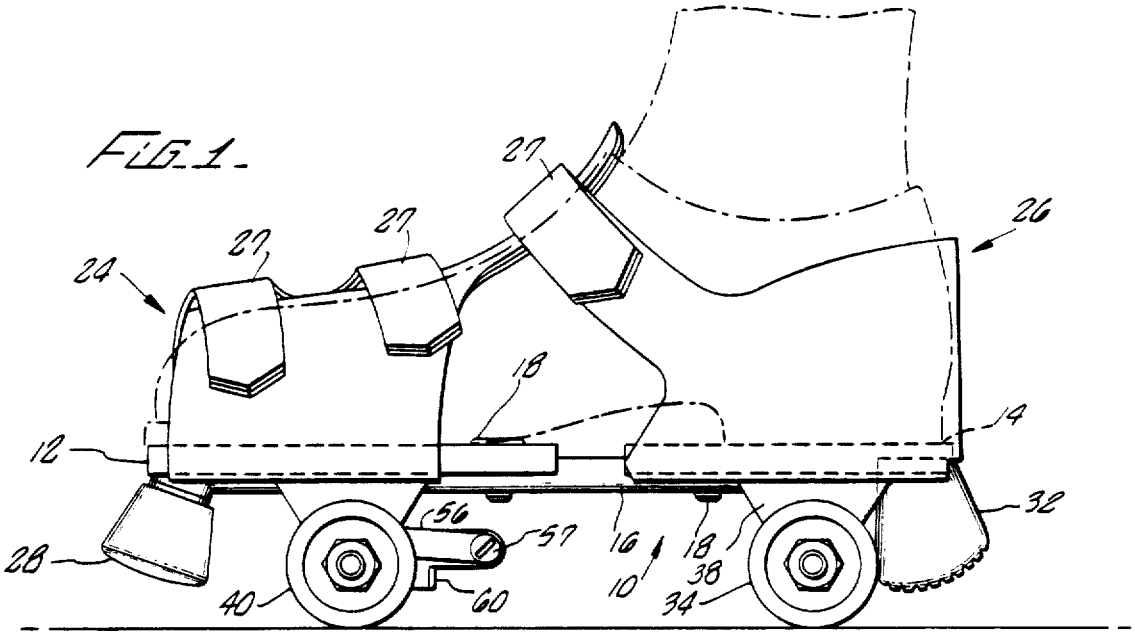
FIG. 1 is a side elevation of the trainer/learner skate of the present invention.
Figure 2:
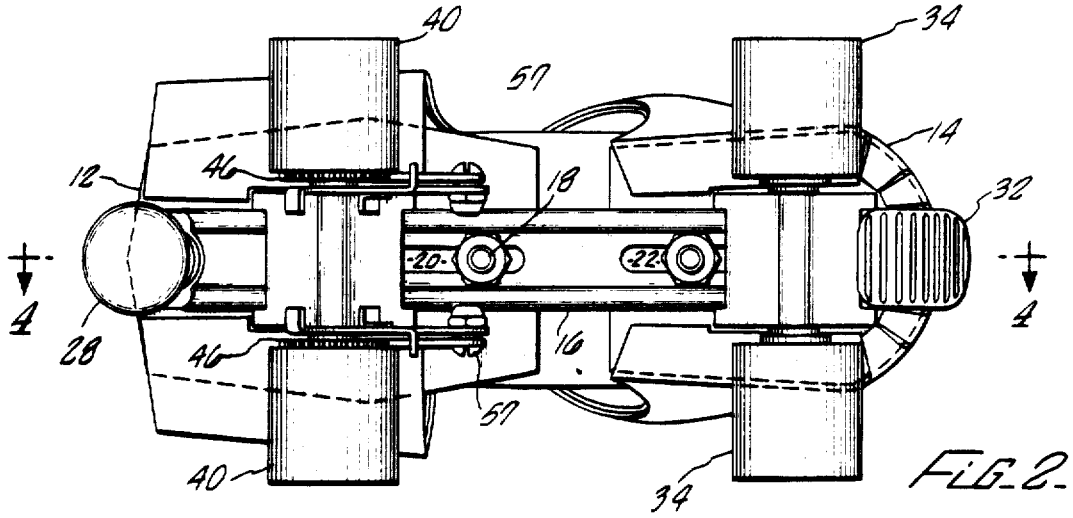
FIG. 2 is a bottom elevation of the roller skate of the present invention.

Referring now to the drawings, the roller skate of the present invention includes a base plate 10 that is comprised of a front base plate 12 and a rear base plate 14 which are connected together by adjustment rail 16 by means of nut and bolt assemblies 18. Nut and bolt assemblies 18 pass through a hole formed in front base plate 12 and a hole in rear base plate 14 and extend through elongated slots 20 and 22 formed in the adjustment rail 16. By loosening nut and bolt assemblies 18 and adjusting the distance between front base plate 12 and rear base plate 14 the length of the skate can be adjusted to any desired size so as to accommodate a range of shoe sizes of the skater.

The skate also includes a shoe-engaging member 24 mounted on the front base plate 12 and a heel-engaging member 26 which is mounted upon rear base plate member 14. In this embodiment of the invention, shoe engaging members 24 and 26 have straps 27 which can be pulled tightly across the shoe or bare foot of the skater to securely attach the shoe or foot to the skate. The underside of straps 27 and corresponding outer surface of shoe engaging members 24 and 26 are fitted with self-locking fabric to provide for quick attachment and release of the skate to the shoe or bare foot of the skater. Other similar quick release means will be readily apparent to those skilled in the art. Also, it is to be understood that other principles of the present invention can be incorporated in a roller skate in which the shoe of the skate is an integral part of the roller skate.

The roller skate of the present invention may also include a conventional front stop member 28 which is mounted at the front end of base plate 12 by any convenient means such as screw 30. In accordance with one aspect of the present invention the roller skate includes a back stop member 32 mounted on the lower surface of rear base plate 14 at the rear end thereof. The function and operation of back stop member 32 will be discussed below.

The preferred embodiment of the saftey roller skate also includes a pair of rear wheels 34 which are journaled on axle 36 that is mounted in a wheel mounting pedestal 38 that projects downwardly from rear base plate 14. A pair of front wheels 40 are journaled upon front axle 42 which is journaled in front wheel pedestal 44. In accordance with the present invention each of the front wheels 40 has a ratchet gear 46 mounted on the inner surface 48 of wheels 40 and which rotate with wheels 40. A pawl mounting bracket 50 is mounted on front axle 42 between each of the ratchet gears 46 and the front wheel mounting pedestal 44, and extends rearwardly from the axle 42. In operation bracket 50 is prevented from rotating by ears 52 and 54 engaging wheel mounting pedestal 44.

It should be understood that the mounting bracket 50 mounted on one of the front wheels is the mirror image of the other mounting bracket 50 mounted on the other wheel.

Figure 6:
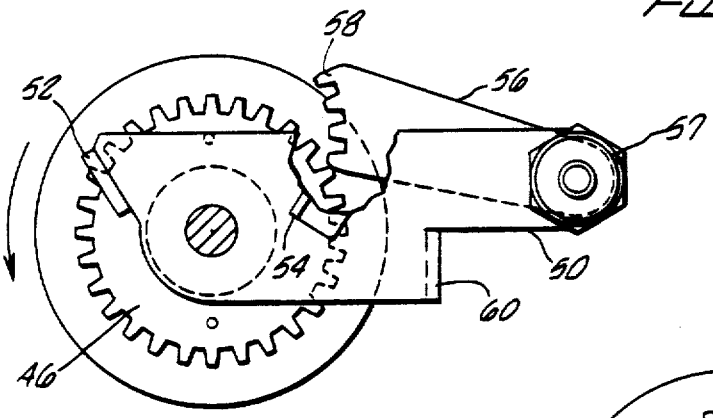
FIG. 6 is a fragmentary elevation illustrating the ratchet and pawl assembly.
Figure 7:
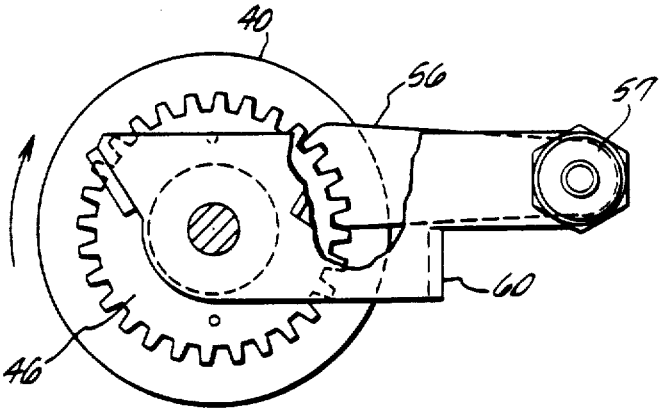
FIG. 7 is a view similar to FIG. 6 illustrating the ratchet and pawl assembly in the engaged position limiting the rotation of the wheel.

A pawl 56 is pivotally mounted at the rearward end of pawl mounting bracket 50 by any suitable means such as nut and bolt assembly 57, and is of such a length and located in such a manner that it is engageable with ratchet gear 46, as best seen in FIGS. 6 and 7. Pawl 56 extends forwardly from its pivot mounting toward ratchet gear 46 and has as its outer end a series of teeth 58 which are adapted to mesh with the teeth of gear 46. In this embodiment, the teeth 58 are concave to adapt to the perimeter of ratchet gear 46. However, teeth 58 may also be formed in a slightly convex shape without loss of efficacy. Thus, as seen in FIGS. 6 and 7, when front wheel 40 rotates in a counter-clockwise or forward direction with respect to the skate orientation, the wheel is free to rotate and pawl 56 is pushed out of engagement with ratchet gear 46. However, if wheel 40 is rotated in the clockwise direction or rearwardly, the teeth 58 of pawl 56 engage the teeth of gear 46, as seen if FIG. 7, and prevent rotation of the wheel 40 in this direction. Bracket 50 includes a stop tab 60 which blocks any rotation of pawl 56 once the teeth 58 have become enmeshed with the teeth on ratchet wheel 46. With the pawl and gear in this position, where pawl 56 engages stop tab 60, the wheel cannot rotate in a clockwise or backward direction. However, once an attempt is made to rotate wheel 40 in a counter-clockwise or forward direction the teeth 58 of pawl 56 will become disengaged from the teeth of ratchet 46 and pawl 56 will rotate or pivot upwardly and out of engagement with ratchet gear 46.

In the event it is desired to allow the skates to move both in the forward and backward direction, the pawl mounting bracket 50 and pawl 56 may be removed by first removing the wheel next to which the bracket 50 is situated and sliding the bracket off of the axle. The wheel is then replaced. In this event, ratchet gear 46 would remain on wheel 40 although it would serve no function. The bracket 50 may also be fitted with cam means to selectively hold pawl 56 in the disengaged position.

Figure 3:
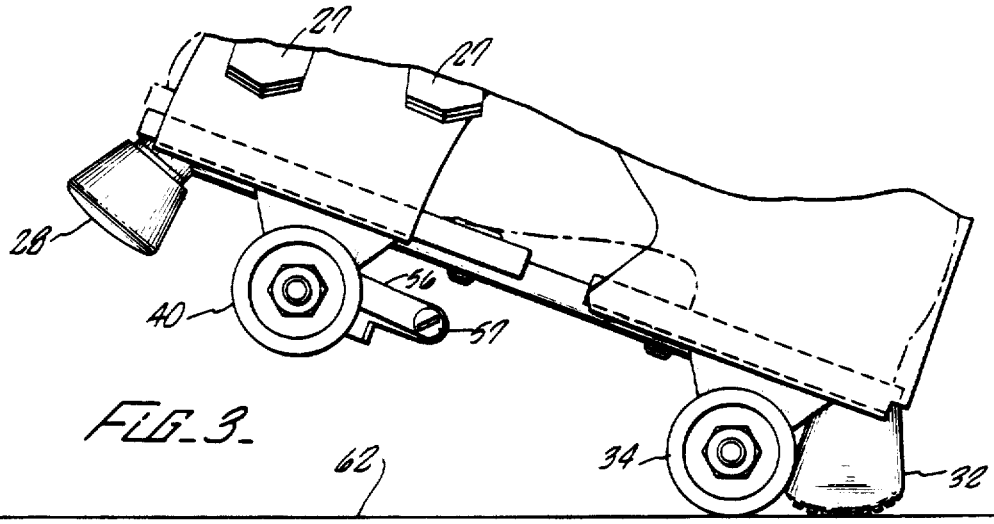
FIG. 3 is a fragmentary side elevation showing the manner in which the back stop acts as either a brake or as a means for preventing the skate from tipping.
Figure 4:
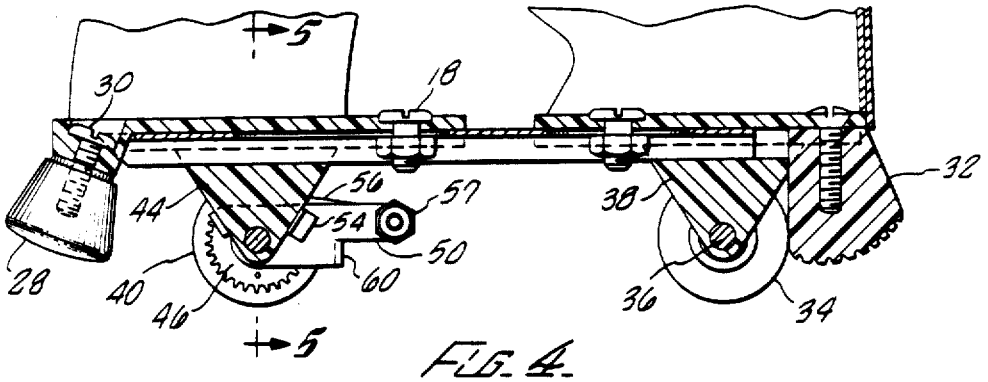
FIG. 4 is a cross-section taken along the lines 4—4 in FIG. 2.
Figure 5:
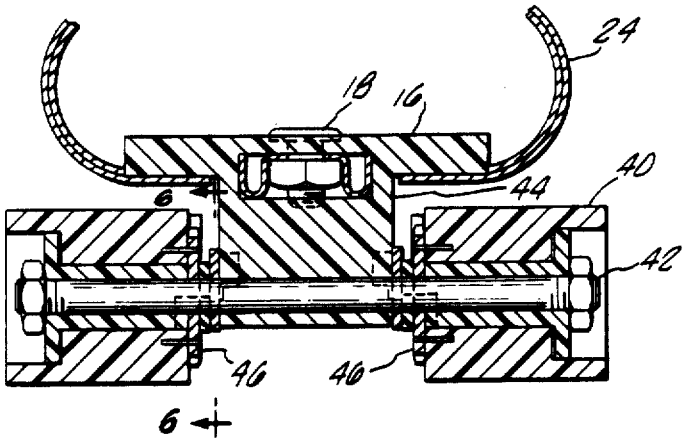
FIG. 5 is a cross-section taken along the lines 5—5 in FIG. 4.

A further aspect of the present invention involves back stop 32 which is mounted by conventional means underneath and at the back of rear base plate 14, extending downwardly from the lower surface of rear base plate 14 toward the support surface 62 upon which the skates would be used. The specific distance that back stop 32 extends from base plate 14 can be varied by the dimension of back stop 32, however, in normal use when all four of the skate wheels are on support surface 62, the back stop 32 will be positioned a distance above the support surface. As seen in FIG. 3, the back stop 32 serves at least two functions. First, if the skater were to tip backwards by rotating the whole skate about rear wheels 34, the back stop would engage the support surface and help prevent the skater from falling. Second, the back stop can be used by the skater as a braking means by deliberately rotating the skate about rear wheels 34 in a rearward direction so that, as seen in FIG. 3, the back stop 32 will engage the support surface and apply frictional brake pressure to slow or stop the skate.

It will be appreciated from the foregoing that by providing a mechanism which permits the roller skate to travel in only one direction, a beginning skater will be able to learn to skate much more safely than with a conventional roller skate that is free to move in two directions. Still, the construction of the present invention is such that the ratchet and pawl assembly can be removed, or the pawl selectively held in the disengaged position, so that the skate can be used in a conventional manner. An added feature of the invention is that it will be much easier for a skater to skate up an incline since the wheels are free to move in only the forward direction. The incorporation of a back stop member provides a roller skate that is safer for a beginning skater because the skater will be less likely to fall backwards while using the roller skate. Finally, the incorporation of the quick release straps enable the skates to be quickly attached to and removed from the shoe or bare foot of the skater.

In the foregoing description, certain terms have been used for brevity, clearness and understanding, but no unnecessary limitations are to be implied therefrom beyond the requirements of the prior art, because such terms are used for descriptive purposes and are intended to be broadly construed. Moreover, the description and illustration of the invention is, by way of example, and the scope of the invention is limited only by the spirit of the appended claims.

What is claimed is:

1. A skate comprising in combination a base plate comprising a front plate and a rear plate attached to, and adjustable on, central rail means; a pair of wheels rotatably attached to said front plate and a second pair of wheels rotatably attached to said rear plate; a ratchet gear fixedly attached to the interior of at least one of said front wheels, said ratchet gear having a plurality of teeth, said front wheels being journaled to said front plate by means of a mounting pedestal which is attached to said front plate and depends downwardly therefrom, through which said front wheels are journaled; a pawl, for engaging said ratchet to prevent rotation of said front wheels in a rearward direction, attached to said mounting pedestal by means of an operation bracket which is securely fastened to said mounting pedestal [by] *and* nut and bolt means *by which said pawl is attached to said bracket*; said pawl having a plurality of teeth; said operation bracket having a stop tab extending therefrom to restrict the rotation of said pawl thereby restricting the rotation of said front wheels; and means for quickly attaching the shoe or bare foot of a skater to said base plate.

2. The skate of claim 1 wherein said pawl has at least three teeth which engage a similar number of teeth on said ratchet gear.

3. The skate of claim 2 wherein said skate has a toe stop member attached to said front plate and a back stop member attached to said rear plate.

4. The skate of claim 3 wherein said means for quickly attaching the shoe or bare foot of a skater to said base plate comprises self locking fabric, said self locking fabric attached to straps which overlap the shoe or foot of the skater.

* * * * *

UNITED STATES PATENT AND TRADEMARK OFFICE

CERTIFICATE OF CORRECTION

PATENT NO. : RE 32346

DATED : FEBRUARY 3, 1987

INVENTOR(S) : Reuben B. Klamer and Robert J. Mortonson

It is certified that error appears in the above-identified patent and that said Letters Patent is hereby corrected as shown below: On the Title Page, Item [73] should read:

[73] Assignee: The Quaker Oats Company, Chicago, Illinois

Signed and Sealed this

Twentieth Day of September, 1988

*Attest:*

DONALD J. QUIGG

*Attesting Officer*

*Commissioner of Patents and Trademarks*

UNITED STATES PATENT AND TRADEMARK OFFICE

CERTIFICATE OF CORRECTION

PATENT NO. : RE 32,346

DATED : February 3, 1987

INVENTOR(S) : Reuben B. Klamer, et al.

It is certified that error appears in the above-identified patent and that said Letters Patent is hereby corrected as shown below:

ON THE TITLE PAGE,

ASSIGNEE: delete [Trend Products Group, Los Angeles, Calif.]
insert --THE QUAKER OATS COMPANY, Merchandise Mart Plaza, Chicao, Illinois --.

Signed and Sealed this

Twenty-eighth Day of February, 1989

*Attest:*

DONALD J. QUIGG

*Attesting Officer*

*Commissioner of Patents and Trademarks*